(12) United States Patent
Funato et al.

(10) Patent No.: US 10,753,296 B2
(45) Date of Patent: Aug. 25, 2020

(54) WORK MACHINE

(71) Applicant: SUMITOMO HEAVY INDUSTRIES CONSTRUCTION CRANES CO., LTD., Tokyo (JP)

(72) Inventors: Koji Funato, Aichi (JP); Tatsuo Koshi, Aichi (JP)

(73) Assignee: SUMITOMO HEAVY INDUSTRIES CONSTRUCTION CRANES CO., LTD., Tokyo (JP)

( * ) Notice: Subject to any disclaimer, the term of this patent is extended or adjusted under 35 U.S.C. 154(b) by 38 days.

(21) Appl. No.: 16/256,580

(22) Filed: Jan. 24, 2019

(65) Prior Publication Data

US 2019/0242313 A1 Aug. 8, 2019

(30) Foreign Application Priority Data

Feb. 7, 2018 (JP) .................................. 2018-020478

(51) Int. Cl.
*F02D 29/04* (2006.01)
*F02D 41/02* (2006.01)
(Continued)

(52) U.S. Cl.
CPC .......... *F02D 41/029* (2013.01); *F01N 3/023* (2013.01); *F01N 9/002* (2013.01); *F02D 29/04* (2013.01); *F01N 2260/04* (2013.01); *F01N 2430/00* (2013.01); *F01N 2590/08* (2013.01); *F01N 2900/08* (2013.01); *F01N 2900/10* (2013.01); *F01N 2900/1404* (2013.01); *F01N 2900/1602* (2013.01); *F01N 2900/1606* (2013.01); *F02D 2041/026* (2013.01); *F02D 2200/0802* (2013.01); *F02D 2200/0812* (2013.01)

(58) Field of Classification Search
CPC ...... F01N 3/023; F01N 2260/04; F02D 29/04; F02D 2041/026
See application file for complete search history.

(56) References Cited

U.S. PATENT DOCUMENTS 9,759,146 B2    9/2017  Tsurumi et al.
2010/0095656 A1* 4/2010 Kamiya ............... F01N 3/0253
                                                        60/287
(Continued)

FOREIGN PATENT DOCUMENTS

JP        2015-007422 A     1/2015

*Primary Examiner* — Jonathan R Matthias
(74) *Attorney, Agent, or Firm* — Michael Best & Friedrich LLP

(57) ABSTRACT

In a work machine including an engine; a hydraulic pump; an actuator; an operating member that operates an actuator; an exhaust gas purifying device; a load application device that applies a load to an engine to raise the temperature of exhaust gas; and a control device, the load application device includes a load application valve that is provided in series between the hydraulic pump and the actuator and performs switching as to whether a hydraulic oil flow channel between the hydraulic pump and the actuator is brought into a communication state or a non-communication state in accordance with a control pressure, and if a load application request is input, the control device changes the control pressure exerted on the load application valve on the basis of the presence or absence of input of an operation signal of the operating member.

7 Claims, 8 Drawing Sheets

(51) Int. Cl.
*F01N 3/023* (2006.01)
*F01N 9/00* (2006.01)

(56) References Cited

U.S. PATENT DOCUMENTS

| | | | |
|---|---|---|---|
| 2012/0227388 A1* | 9/2012 | Asakage | F02D 41/029 60/311 |
| 2013/0067895 A1* | 3/2013 | Noma | F01N 3/023 60/311 |

* cited by examiner

WORK MACHINE

RELATED APPLICATIONS

Priority is claimed to Japanese Patent Application No. 2018-020478, filed Feb. 7, 2018, the entire content of which is incorporated herein by reference.

BACKGROUND

Technical Field

Certain embodiments of the present invention relate to a work machine, such as a crane, and particularly, to a technique that regenerates an exhaust gas purifying device.

Description of Related Art

Exhaust gas purifying devices for trapping soot contained in exhaust gas of an engine have been known from the past. Regeneration operation is performed in the exhaust gas purifying devices. The regeneration operation is an operation in which the exhaust gas purifying devices are regenerated by combusting soot (particulate matter). The regeneration operation is performed, for example, by increasing the load (engine load) applied to the engine and raising the exhaust gas temperature of the engine. For example, a load application device, such as a load application valve, is provided in a work machine in order to perform this regeneration operation.

As a related art regarding the control of the regeneration operation, for example, the related art discloses that "an exhaust gas purification control device includes an engine; an actuator having the engine as a drive source; an operating unit for allowing an operator to operate the actuator or the engine; an operation detection unit that detects the presence or absence of operation of the operating unit; a purifying device that traps soot in exhaust gas of the engine; a deposition amount detection unit that detects the deposition amount of the soot trapped by the purifying device; a regeneration unit that performs a regeneration operation (an operation in which the soot trapped by the purifying device is combusted to regenerate the purifying device), and a control unit that controls the regeneration operation. The control unit stepwise switches from a control of prioritizing the operation by the operating unit to a control of prioritizing the regeneration operation as the deposition amount of the soot detected by the deposition amount detection unit increases". According to this related art, the workability of a construction machine can be easily secured, and opportunities for the regeneration of the purifying device can be easily secured (refer to Abstract).

SUMMARY

According to an embodiment of the present invention, there is provided a work machine including an engine; a hydraulic pump driven by the engine; an actuator actuated by the hydraulic oil supplied from the hydraulic pump; an operating member that operates the actuator; an exhaust gas purifying device that purifies an exhaust gas of the engine; a load application device that applies a load to the engine to raise a temperature of the exhaust gas; and a control device that controls an operation of the load application device on the basis of input of a load application request that is a start command of regeneration operation by the load application device. A particulate matter deposited on the exhaust gas purifying device is combusted to regenerate the exhaust gas purifying device. The load application device includes a load application valve that is provided in series between the hydraulic pump and the actuator and performs switching as to whether a hydraulic oil flow channel between the hydraulic pump and the actuator is brought into a communication state or a non-communication state in accordance with a control pressure. If the load application request is input, the control device changes the control pressure exerted on the load application valve on the basis of the presence or absence of input of an operation signal of the operating member, and controls the hydraulic pump so as to supply hydraulic oil from the hydraulic pump to the actuator irrespective of the presence or absence of the input of the operation signal of the operating member.

DETAILED DESCRIPTION

However, in the related art, the regeneration operation is not started during the operation of the actuator. Additionally, in the related art, a forced regeneration control of forcibly performing the regeneration operation is included. However, since this forced regeneration control is also started on the assumption that there is no operation of the actuator, the regeneration operation cannot be executed during the operation of the actuator. For that reason, in a case where the operation of the actuator continues for a long time, the soot continues being deposited on the purifying device. As a result, a case where the engine stops if the deposition amount of the soot exceeds a threshold also occurs. Additionally, in the related art, the operation of an actuator should be temporarily interrupted in order to start the regeneration operation during the operation of the actuator, and working efficiency is poor.

It is desirable to provide a work machine that can execute regeneration operation of an exhaust gas purifying device without interrupting the operation of an actuator.

According to the invention, it is possible to provide the work machine that can execute the regeneration operation of the exhaust gas purifying device without interrupting the operation of the actuator. In addition, problems, configurations, and effects other than those described above will be clarified from the description of the following embodiment.

Figure 1:
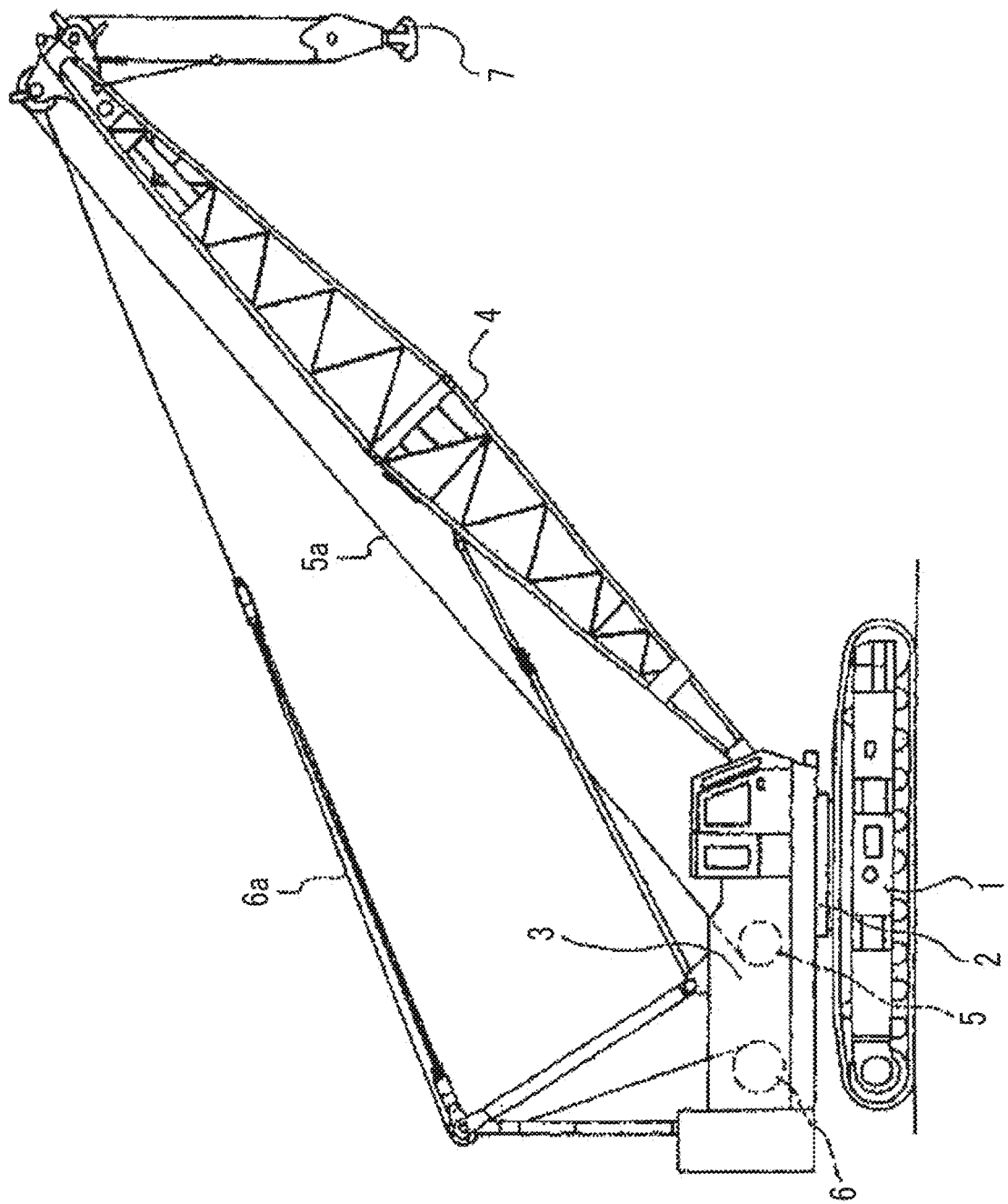
FIG. 1 is a side view of a crane related to an embodiment of an invention.

Hereinafter, embodiments of the invention will be described with reference to the drawings. FIG. 1 is a side view of a crane that is an example of a work machine related to the invention. As illustrated in FIG. 1, the crane has a crawler type traveling body (lower body) 1, a swiveling body 3 swivelably provided on the traveling body 1 via a swiveling wheel 2, and a boom 4 turnably journaled to the swiveling body 3. A hoisting drum 5 and a derricking drum 6 are mounted on the swiveling body 3. A hoisting rope 5a is wound around the hoisting drum 5, the hoisting rope 5a is wound up or unwound by the driving of the hoisting drum 5, and a hook 7 is moved up and down. A derricking rope 6a is wound around the derricking drum 6, the derricking rope 6a is wound up or unwound by the driving of the derricking drum 6, and the boom 4 is hoisted up and down.

The swiveling wheel 2 is driven by a swiveling hydraulic motor, the hoisting drum 5 is driven by a hoisting hydraulic motor, and the derricking drum 6 is driven by a derricking hydraulic motor. Additionally, the traveling body 1 is driven by a traveling hydraulic motor and is moved forward and backward. The rotation of the hydraulic motors is capable of being braked brake devices. In this way, the crane includes the plurality of hydraulic motors, and each hydraulic motor is equivalent to an actuator of the invention.

Figure 2:
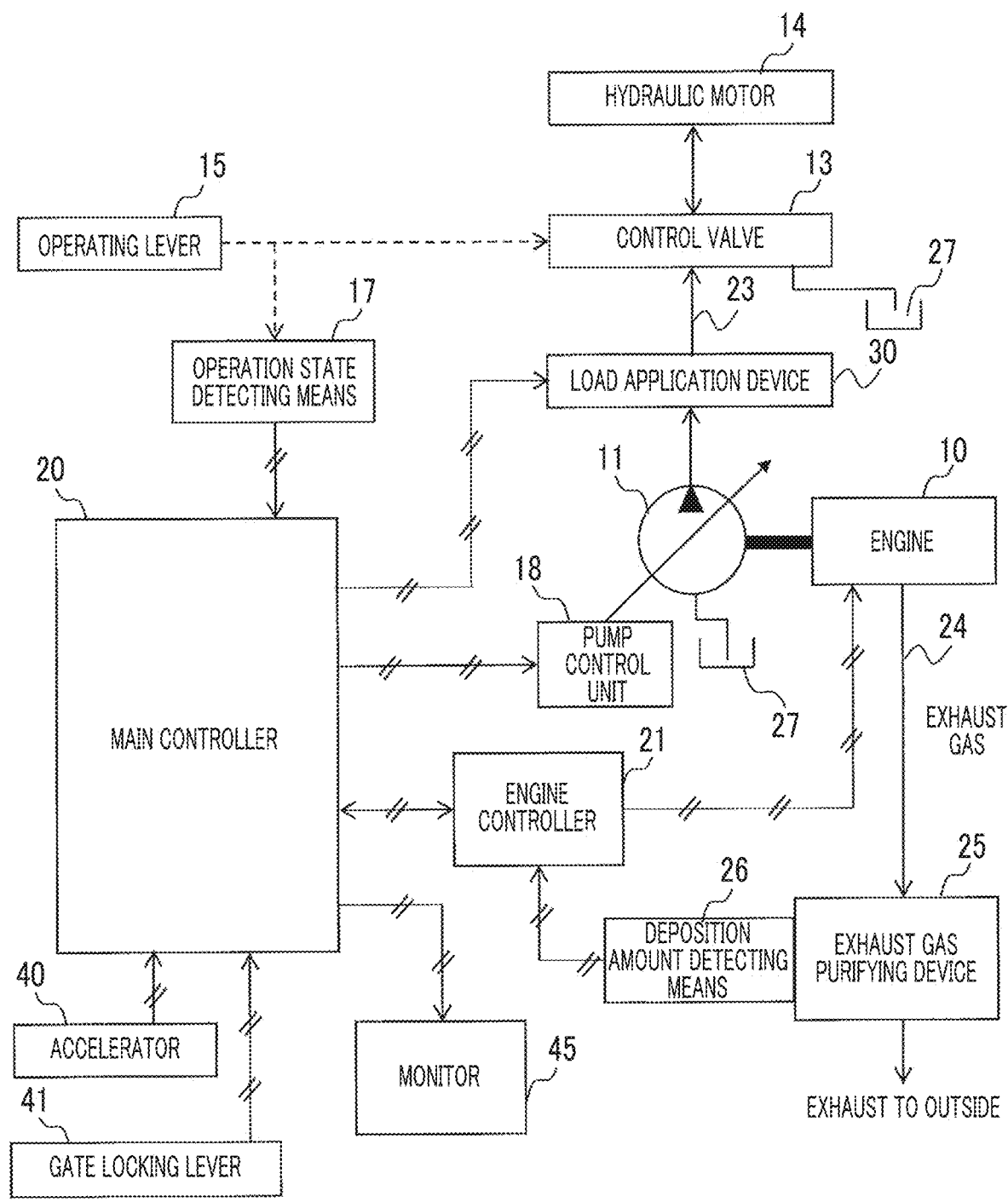
FIG. 2 is a view illustrating an internal configuration of the crane.

FIG. 2 is a view illustrating an internal configuration of the crane. As illustrated in FIG. 2, the crane is configured to include, mainly, an engine 10; a variable-volume type hydraulic pump 11; a load application device 30 that applies a load to the hydraulic pump 11 at the time of a regeneration operation; a control valve 13 that controls the flow direction of hydraulic oil; a hydraulic motor 14 that is actuated with the hydraulic oil supplied via the control valve 13 from the hydraulic pump 11; an operating lever (operating member) 15 that causes a pilot pressure to act on the control valve 13 to switch a spool position to operate the hydraulic motor 14; an exhaust gas purifying device 25 that purifies the exhaust gas of the engine 10; an engine controller 21 that controls the rotation speed or the like of the engine 10; a main controller (control device) 20, and a monitor (notification device) 45.

The hydraulic pump 11 is driven by the engine 10 to discharge the hydraulic oil stored in a tank 27. By controlling the inclination angle of the hydraulic pump 11 by a pump control unit 18, the discharge flow rate (volume) of the hydraulic pump 11 can be changed. In addition, the pump control unit 18 is a regulator, and controls the inclination angle of the hydraulic pump 11 on the basis of an electrical signal input from the main controller 20.

The exhaust gas purifying device 25 is a diesel particulate filter (DPF) device that is provided in an exhaust pipe 24 through which that the exhaust gas of the engine 10 flows, and that traps soot (particulate matter) in the exhaust gas of the engine 10 to combust the soot. In order to combust the soot, it is necessary to raise the temperature of the exhaust gas. A device for raising the temperature of the exhaust gas is the load application device 30.

The load application device 30 is provided in series between the hydraulic pump 11 and the hydraulic motor 14, and switches a hydraulic oil flow channel 23 between a communication state and a non-communication state in accordance with control pressure. In a case where a hydraulic oil flow channel 23 is switched to the non-communication state, a load is applied to the hydraulic pump 11 and the temperature of the exhaust gas of the engine 10 rises. In addition, the details of the load application device 30 will be described below.

Deposition amount detecting means 26 is a sensor that detects the amount of the soot deposited within the exhaust gas purifying device 25, and outputs information on the deposition amount of the soot detected by the deposition amount detecting means 26 to the engine controller 21 as an electrical signal. The engine controller 21 requests the main controller 20 to perform the regeneration operation for combusting the soot on the basis of the input detection signal from the deposition amount detecting means 26. That is, the engine controller 21 outputs a load application request to the main controller 20.

The main controller 20 has a CPU, a ROM, a RAM, a communication interface (I/F), and the like that are not illustrated, and controls various kinds of operation of the crane including the regeneration operation on the basis of a control program. An operation signal from operation state detecting means 17 that is a sensor that detects the operation state of the operating lever 15, an operation signal of an accelerator 40, and an operation signal of a gate locking lever 41 that prohibits the operation of the operating lever 15 are input to the main controller 20 as electrical signals. In addition, the operating lever 15 includes a swiveling operating lever that turns the swiveling body 3, a traveling operating lever that causes the traveling body 1 to travel, a derricking operating lever that hoists the boom 4 up and down, and the like.

The monitor 45 is a liquid crystal monitor provided within a cabin of the crane, and notifies an operator of various kinds of information on the basis of an electrical signal input from the main controller 20. In addition, the monitor 45 may be an exclusive monitor that displays messages M1 and M2 to be described below.

Figure 3:
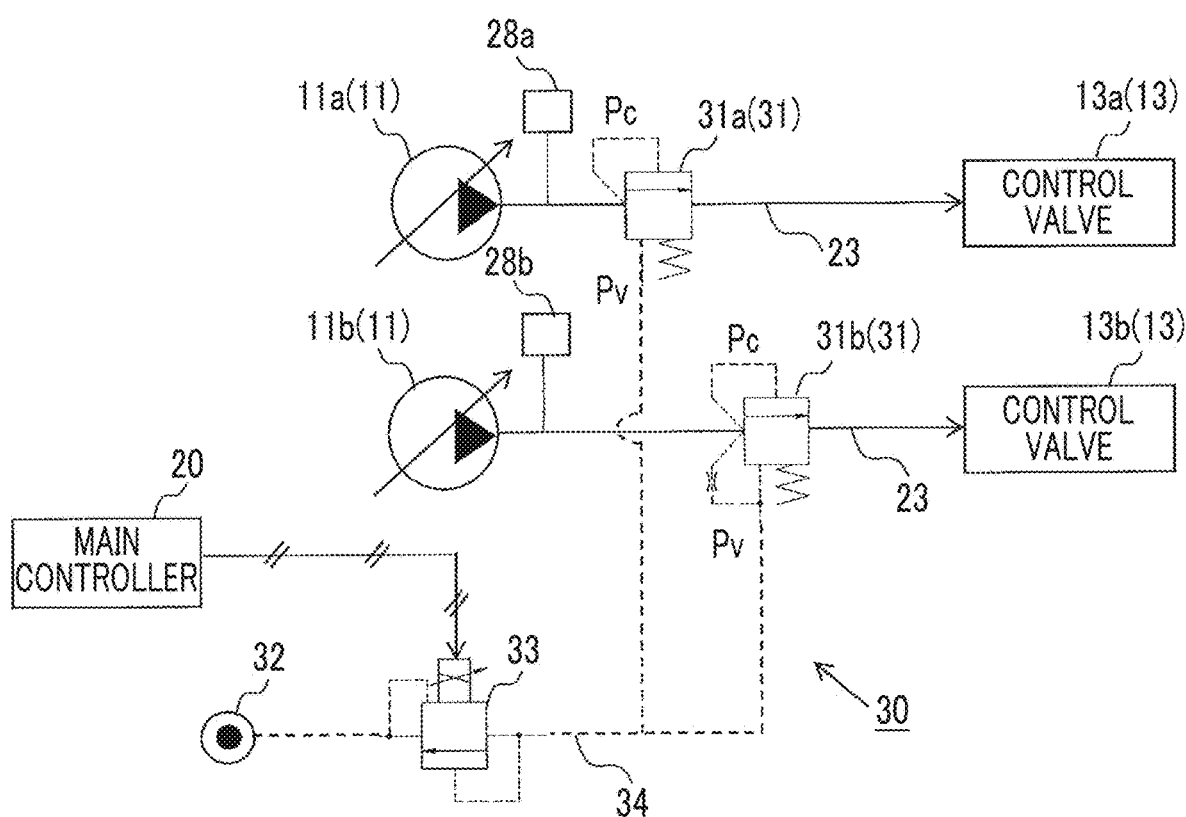
FIG. 3 is a configuration view of a load application device.

Next, the configuration of the load application device 30 will be described. FIG. 3 is a configuration view of the load application device 30. As illustrated in FIG. 3, the load application device 30 includes a load application valve 31, a pilot hydraulic source 32, a pilot flow channel 34 for guiding the pilot pressure (control pressure) from the load application valve 31 to the pilot hydraulic source 32, and an electromagnetic proportional valve 33 provided in the pilot flow channel 34. In addition, since an actual crane is provided with a plurality of the hydraulic pumps 11 and a plurality of the control valves 13, a plurality of the load application valves 31 are also provided. Thus, FIG. 2 representatively illustrates hydraulic pumps 11a and 11b among the plurality of plurality of hydraulic pumps 11, load application valves 31a and 31b among the plurality of control valves 13, and control valves 13a and 13b among the plurality of load application valves 31, respectively.

The pilot hydraulic source 32 is driven by the engine 10, and is constituted of a fixed volume type hydraulic pump (not illustrated) that discharges pilot pressure oil. The pilot pressure oil from the pilot hydraulic source 32 flows through the pilot flow channel 34, and acts on each load application valve 31. In addition, in the following description, the pilot pressure oil that flows through the pilot flow channel 34 may be simply referred to as the pilot pressure.

The electromagnetic proportional valve 33 changes the pressure on an outlet side of the electromagnetic proportional valve 33 on the basis of a control signal (electrical signal) input from the main controller 20. That is, the electromagnetic proportional valve 33 changes setting of the pilot pressure (control pressure) made to act on the load application valve 31.

The load application valve 31 is a relief valve that is actuated in accordance with a pressure difference between a discharge pressure (Pc) of the hydraulic pump 11, and a pilot pressure (Pv) that is an external command pressure that is reduced in the electromagnetic proportional valve 33. That is, the load application valve 31 brings the hydraulic oil flow channel 23 into the communication state when the pressure Pc is larger than the pressure Pv, and brings the hydraulic oil flow channel 23 into the non-communication state when the pressure Pc is equal to or lower than the pressure Pv. From this, the pilot pressure (Pv) the electromagnetic proportional valve 33 can also be referred to as a set pressure of the relief valve. As the pressure Pv is increased, the load of each hydraulic pump 11 increases and the load of the engine 10 also increases. That is, as the pressure Pv is increased, the temperature of the exhaust gas of the engine 10 rises. In addition, the discharge pressure (Pc) of the hydraulic pump 11 is detected by a pressure sensor 28a or 28b, and a detection signal of the pressure sensor 28a or 28b is output to the main controller 20.

Figure 4:
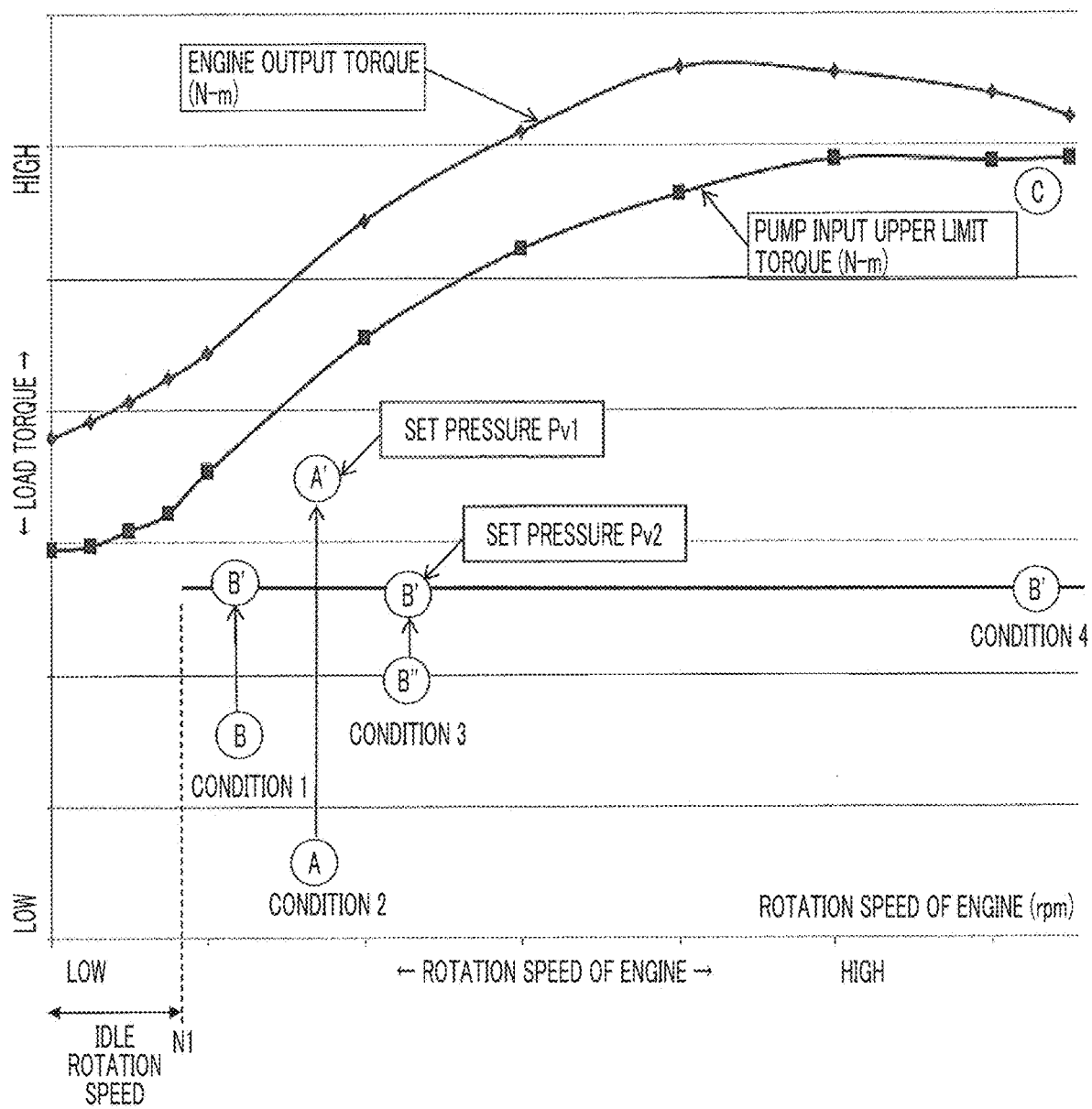
FIG. 4 is a view illustrating a relationship among rotation speed of an engine, load torque, and the set pressure of pilot pressure.

Next, the setting of the pilot pressure (Pv) that is reduced in the electromagnetic proportional valve 33 will be described. FIG. 4 is a view illustrating a relationship among rotation speed of an engine, load torque, and the set pressure of the pilot pressure (Pv).

Condition 1

In Condition 1, a case where the rotation speed of the engine is a low speed and the operation signal of the operating lever 15 is input, that is, a case where the operator is performing light-load work is assumed. In Condition 1, if the regeneration operation is started and the load of the hydraulic pump 11 is applied, there is a concern that the flow rate of the hydraulic oil to be supplied to the hydraulic motor 14 may decrease and operability may deteriorate. For that reason, in the case of Condition 1, the main controller 20 outputs a command to the electromagnetic proportional valve 33 so as to increase the load torque of the hydraulic pump 11 from B to B', that is, so as obtain a set pressure Pv2.

Condition 2

In Condition 2, a case where the rotation speed of the engine is a low speed and the operation signal of the operating lever 15 is not input, that is, a case where the operator is stopping work is assumed. In Condition 2, since work is not performed, the operability is not affected even if the regeneration operation is started and a large load is applied to the hydraulic pump 11. Thus, in the case of Condition 2, the main controller 20 outputs a command to the electromagnetic proportional valve 33 so as to increase the load torque of the hydraulic pump 11 from A to A' (A'>B'), that is, so as to obtain a set pressure Pv1 (Pv1>Pv2). Accordingly, the time of the regeneration operation can be shortened compared to Condition 1.

Condition 3

Condition 3 is the same as Condition 1 except that a workload applied by the operator is slightly larger than that in Condition 1. Even in this case, if the load of the hydraulic pump 11 is excessively applied, there is a concern that the operability is affected. Therefore, similarly to the case of Condition 1, the main controller 20 outputs a command to the electromagnetic proportional valve 33 so as to increase the load torque of the hydraulic pump 11 from B" to B', that is, so as obtain the set pressure Pv2.

Condition 4

In Condition 4, a case where the rotation speed of the engine is a high speed and the operation signal of the operating lever 15 is input, that is, a case where the operator is performing heavy-load work is assumed. In Condition 4, since the discharge pressure (Pc) of the hydraulic pump 11 is always much larger than the pilot pressure (Pv), the load application valve 31 is fully opened and the hydraulic oil flow channel 23 is held in the communication state. Also, a large load is applied to the hydraulic pump 11, and the temperature of the exhaust gas of the engine 10 sufficiently exceeds a temperature required for the regeneration operation.

Figure 5:
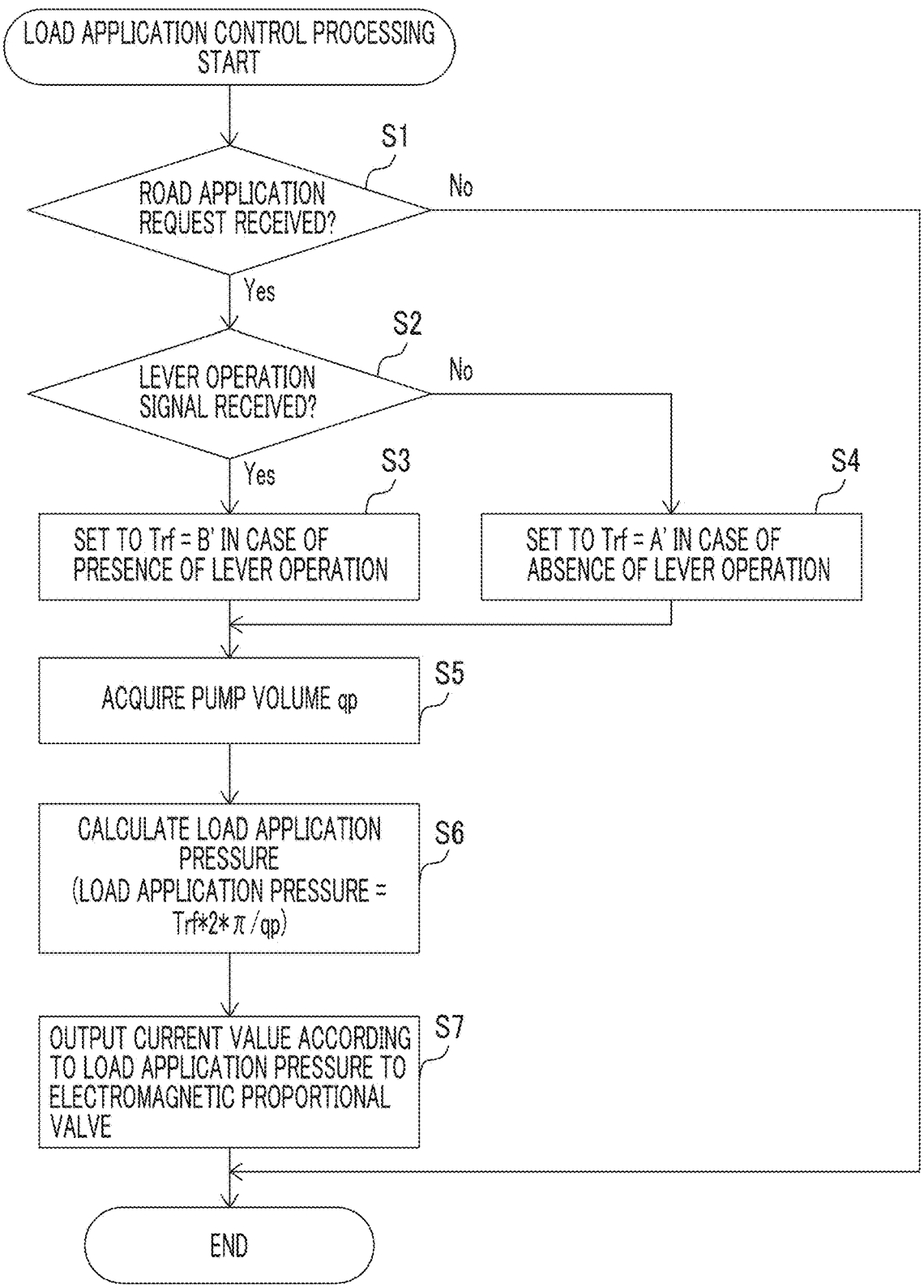
FIG. 5 is a flowchart illustrating a procedure of load application control processing.

In the case of Condition 4, since the operation signal of the operating lever 15 is input, the main controller 20 outputs a command to the electromagnetic proportional valve 33 so as to obtain similarly to the set pressure Pv2 similarly to Conditions 1 and 3 (refer to S3 of FIG. 5). However, since the pressure P1 of the hydraulic oil flow channel 23 is far larger than the set pressure Pv2, the load application valve 31 is fully opened. That is, the discharge pressure of the hydraulic pump 11 becomes a pressure according to the workload irrespective of the set pressure of the electromagnetic proportional valve 33. For that reason, it is not necessary to change the control of the electromagnetic proportional valve 33 in accordance with the workload.

Next, a procedure of the load application control processing by the main controller 20 will be described. FIG. 5 is a flowchart illustrating the procedure of the load application control processing. As illustrated in FIG. 5, the main controller 20 determines whether or not a load application request is received from the engine controller (ECU) 21 (S1), determines whether or not the operation signal of the operating lever 15 is received in a case where the load application request is received (S1/Yes) (S2) and ends the processing in a case where the load application request is not received (S1/No). Next, the main controller 20 set a calculated parameter Trf=B' (refer to FIG. 4) of the load application pressure (to be described below) (S3) in a case where the operation signal of the operating lever 15 is received (S2/Yes). On the other hand, the main controller 20 sets the parameter Trf=A' (refer to FIG. 4) (S4) in a case where the operation signal of the operating lever 15 is not received (S2/No).

Next, the main controller 20 acquires a volume qp of the hydraulic pump 11 controlled via the pump control unit 18 (S5), and calculates the load application pressure (S6). Specifically, the load application pressure (the pressure of the load applied to the hydraulic pump 11, that is, the pressure Pv exerted by the load application valve 31) can be calculated from Expression (1) when a load torque required for the regeneration is Trf (N–m) and the volume of the hydraulic pump 11 is qp (cc/rev).

$$\text{Load application pressure } (Pv)=Trf*2*\pi/qp. \qquad \text{Expression (1)}$$

The main controller 20 outputs a current value according to the load application pressure obtained in Expression (1) to the electromagnetic proportional valve 33 (S7). In addition, a table in which a relationship between the load application pressure and the current value is defined is stored in the ROM of the main controller 20, and the main controller 20 outputs the current value (control current) corresponding to the load application pressure obtained in S6 with reference to the table. Specifically, a current value corresponding to Trf=A' and a current value corresponding to Trf=B' are stored in advance within the ROM, and the main controller 20 outputs any current value to the electromagnetic proportional valve 33 in accordance with the values of Tef set in S3 and S4.

In this way, in the present embodiment, the predetermined pilot pressure Pv2 acts on the load application valve 31 in a case where the operating lever 15 is operated, and the predetermined pilot pressure Pv1 (here, Pv1>Pv2) acts on the load application valve 31 in a case where the operating lever 15 is not operated. Then, during the operation of the operating lever 15, compared to a case where the operating lever 15 is not operated, a low load is applied to the hydraulic pump 11, and the regeneration operation is performed.

Figure 6:
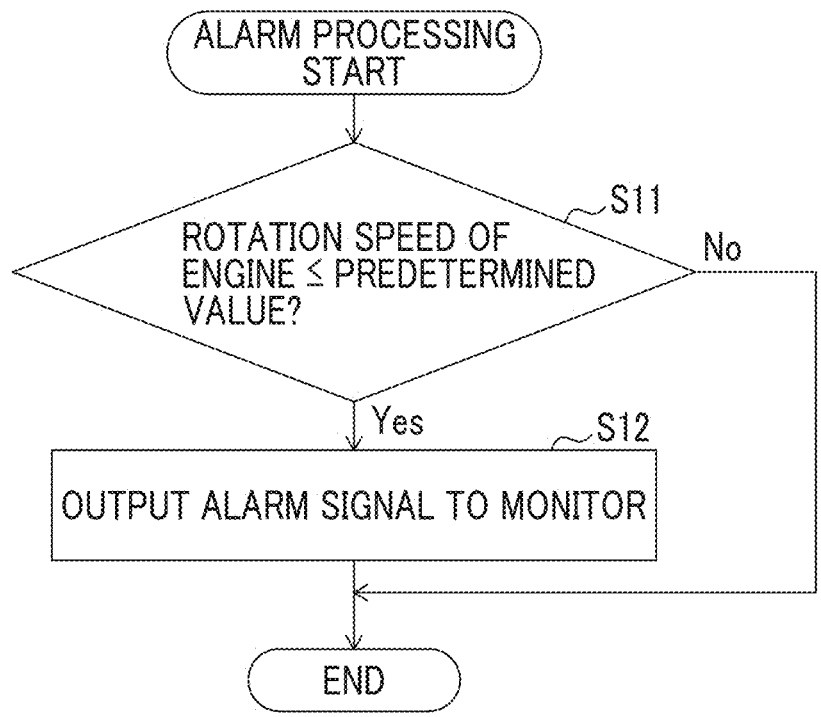
FIG. 6 is a flowchart illustrating a procedure of alarming processing.

Next, a procedure of alarming processing by the main controller 20 will be described. FIG. 6 is a flowchart illustrating the procedure of the alarming processing. The main controller 20 determines whether or not the rotation speed of the engine is equal to or less than an idle rotation speed N1 (refer to FIG. 4) that is determined as a predetermined value (S11), and outputs an alarm signal to the monitor 45 (S12) in a case where the rotation speed of the engine is equal to or less than the idle rotation speed N1 (S11/Yes). On the other hand, the main controller 20 ends the processing in a case where the rotation speed of the engine is larger than the idle rotation speed N1 (S11/N0).

Figure 7:
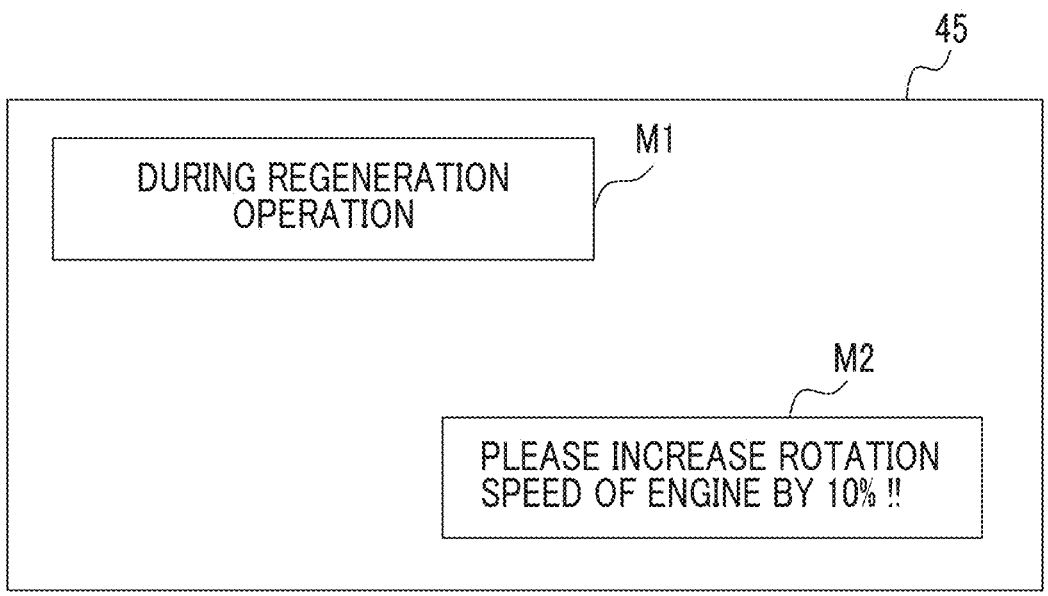
FIG. 7 is a display example of an alarm displayed on a monitor.

Next, a display example of the monitor 45 in a case where the alarm signal is output to the monitor 45 in S12 will be described. FIG. 7 is a display example of an alarm displayed on a monitor 45. As illustrated in FIG. 7, if the alarm signal is input from the main controller 20, a message M1 of "during regeneration operation" and a message M2 of "Please increase rotation speed of the engine by 10% !!" are displayed on the monitor 45. The operator can prevent the stall of the engine 10 during the regeneration operation by viewing this alarm display to increase the rotation speed of the engine.

As described above, according to the present embodiment, regeneration operation is possible irrespective of the presence or absence of operation of the operating lever 15. Thus, it is not necessary to interrupt the work of the crane for the regeneration operation. Additionally, when the regeneration operation is performed, the deterioration of the operability can be prevented by applying a light load to the hydraulic pump 11 during the work of the crane. On the other hand, in a case where the work of the crane is not performed, the load applied to the hydraulic pump 11 is increased compared to during the operation of the crane operation. Thus, compared to a case where the regeneration operation is performed, regeneration time can be shortened during the work of the crane. Additionally, since the messages M1 and M2 that urge an increase in rotation speed of the engine in an idle state are displayed on the monitor 45, the stall of the engine 10 can be prevented when the regeneration operation is performed in a region where the rotation speed of the engine is a low speed. Of course, it is needless to say that various notification aspects are possible in addition to the messages M1 and M2.

REFERENCE TO OTHER EMBODIMENTS

In addition, the invention is not limited to the aforementioned embodiment, and various modifications can be made without departing from the concept of the invention. All the technical matters included in the technical idea described in the claims are subjects targets of the invention. Although the above embodiment shows a preferable example, it is possible for a person skilled in the art to realize various alternatives, alterations, modifications, or improvements from the contents disclosed in the present specifications. These are included in the technical scope described in the attached claims.

Modification Example 1

Figure 8:
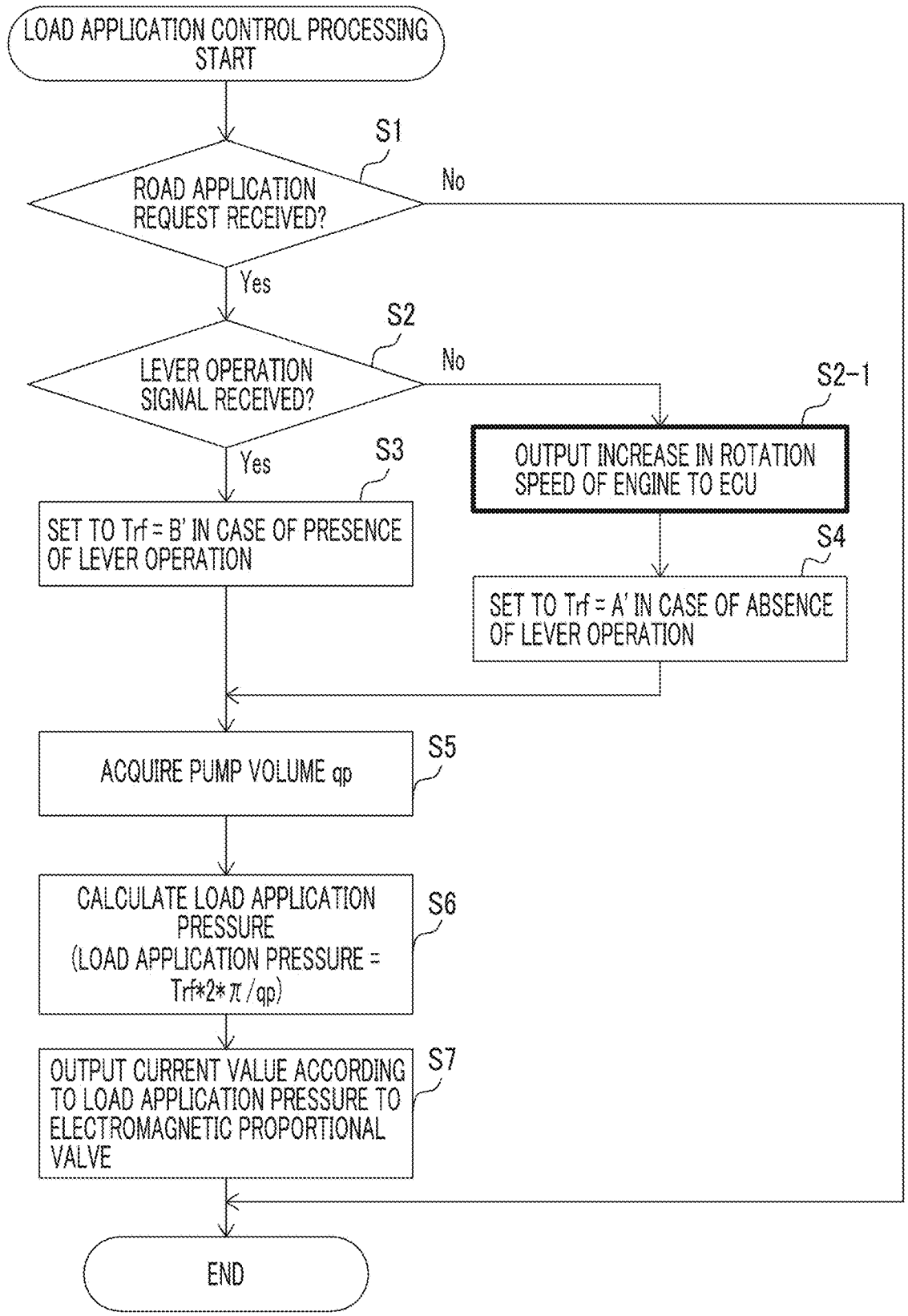
FIG. 8 is a flowchart illustrating a procedure of the load application control processing related to Modification Example 1.

FIG. 8 is a flowchart illustrating a procedure of the load application control processing related to Modification Example 1. This modification example is different from the above embodiment in that processing (S2-1) in which the rotation speed of the engine is automatically increased is added between the processing of S2 and the processing of S4.

Specifically, in a case where the operation signal of the operating lever 15 is not received (S2/No), the main controller 20 outputs a signal to increase the rotation speed of the engine by, for example, 10% to the engine controller (ECU) 21. Accordingly, since the load of the engine 10 increases and the temperature of the exhaust gas of the engine 10 further rises, the regeneration time can be further shortened.

Modification Example 2

Figure 9:
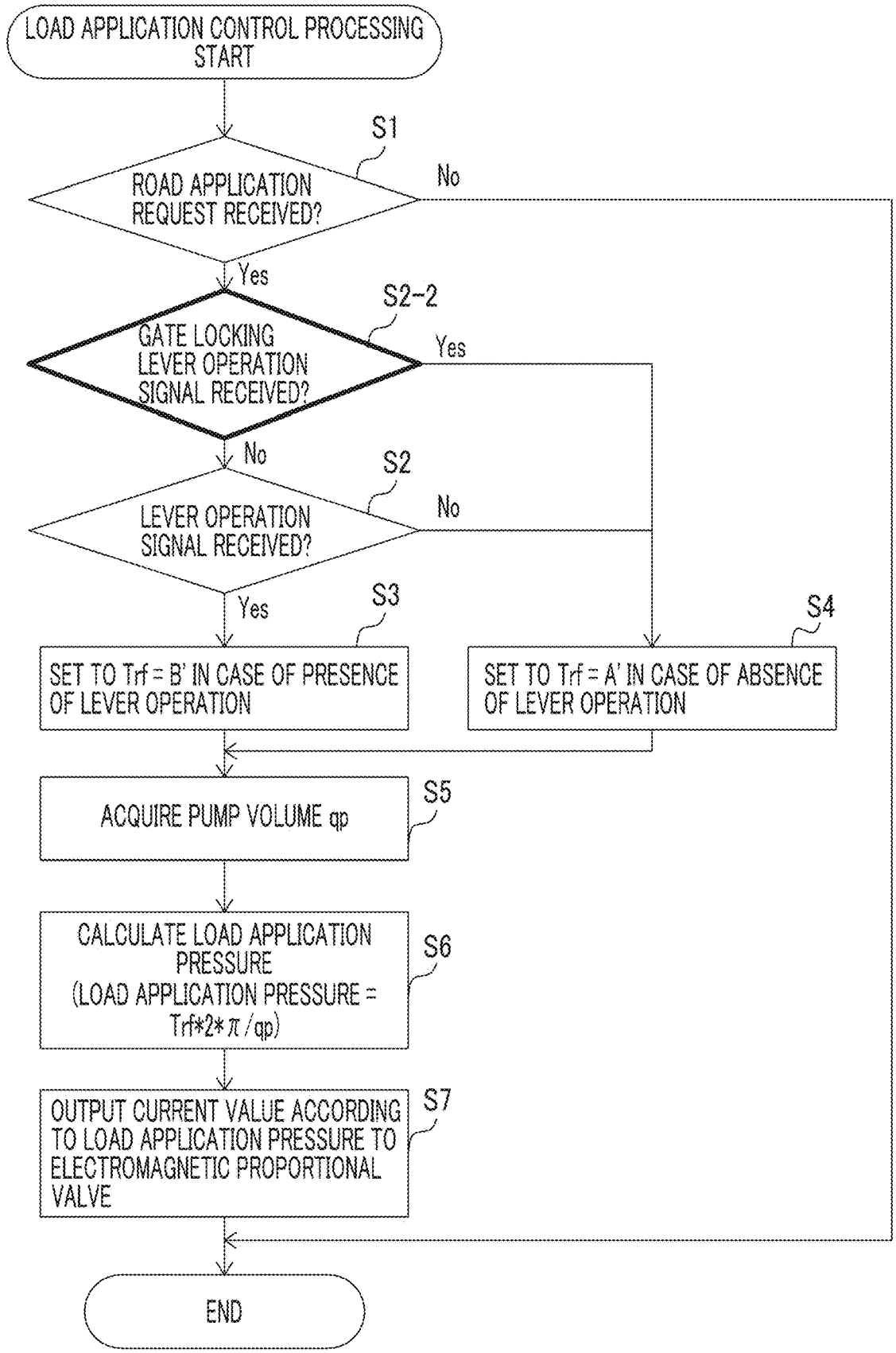
FIG. 9 is a flowchart illustrating a procedure of the load application control processing related to Modification Example 2.

FIG. 9 is a flowchart illustrating a procedure of the load application control processing related to Modification Example 2. This modification example is different from the above embodiment in that processing (S2-2) in which whether or not the operation signal of the gate locking lever 41 having been received is determined is added between the processing of S1 and the processing of S2.

Specifically, since the operation of the operating lever 15 is prohibited in a case where the operation signal of the gate locking lever 41 is received (S22/Yes), the main controller 20 proceeds to S4 without determining the presence or absence of the operation signal of the operating lever 15, and sets the parameter Trf=A'. Accordingly, it is possible to more reliably determine that the work of the crane is not being performed, and to execute the regeneration operation. In addition, Modification Example 1 and Modification Example 2 may be combined together.

In the invention, in addition to the relief valve, any pressure control valve can be used as the load application valve 31. In this case, an electrical signal may be used instead of the pilot pressure as the control pressure. That is, in the regeneration operation, any pressure control valve is applicable to the invention as long as a configuration in which different loads can be applied to the hydraulic pump 11 depending on the presence or absence of operation of the operating lever 15 is provided. Additionally, the operating lever 15 can be substituted with an operation switch.

Additionally, even if the inclination angle of the hydraulic pump 11 is controlled instead of changing the set pressure of the load application valve 31, the same effects can be exhibited. Additionally, the invention is applicable to various work machines, such as a hydraulic shovel, a wheel loader, and a forklift, in addition to the crane.

It should be understood that the invention is not limited to the above-described embodiment, but may be modified into various forms on the basis of the spirit of the invention. Additionally, the modifications are included in the scope of the invention.

What is claimed is:

1. A work machine comprising:
an engine;
a hydraulic pump driven by the engine;
an actuator actuated by the hydraulic oil supplied from the hydraulic pump;
an operating member that operates the actuator;
an exhaust gas purifying device that purifies an exhaust gas of the engine;
a load application device that applies a load to the engine to raise a temperature of the exhaust gas; and
a control device that controls an operation of the load application device on the basis of input of a load application request that is a start command of regeneration operation by the load application device,
wherein a particulate matter deposited on the exhaust gas purifying device is combusted to regenerate the exhaust gas purifying device,
wherein the load application device includes a load application valve that is provided in series between the hydraulic pump and the actuator and performs switching as to whether a hydraulic oil flow channel between the hydraulic pump and the actuator is brought into a communication state or a non-communication state in accordance with a control pressure, and
wherein if the load application request is input, the control device changes the control pressure exerted on the load application valve on the basis of the presence or absence of input of an operation signal of the operating member, and controls the hydraulic pump so as to supply hydraulic oil from the hydraulic pump to the actuator irrespective of the presence or absence of the input of the operation signal of the operating member.

2. The work machine according to claim 1,
wherein the control device changes the control pressure exerted on the load application valve to a low pressure in a case where the operation signal of the operating member is input compared to a case where the operation signal of the operating member is not input.

3. The work machine according to claim 2,
wherein the load application device further includes:
a pilot flow channel for exerting a pilot pressure supplied from a pilot hydraulic source on the load application valve as the control pressure, and
an electromagnetic proportional valve that is provided in the pilot flow channel and changes the pilot pressure in accordance with a control signal from the control device.

4. The work machine according to claim 3,
wherein the load application valve is a relief valve that is actuated in accordance with a difference between the pilot pressure changed in the electromagnetic proportional valve and a pressure of the hydraulic oil on an inlet side of the load application valve.

5. The work machine according to claim 1, further comprising:
a notification device that notifies an operator of information,
wherein the control device outputs an alarm signal to the notification device in a case where the rotation speed of the engine is equal to or lower than a predetermined value, and
wherein the notification device performs notification of urging an increase in the rotation speed of the engine on the basis of the alarm signal having been input.

6. The work machine according to claim 1,
wherein the control device performs a control so as to automatically increase the rotation speed of the engine in a case where the load application request is input and there is no input of the operation signal of the operating member.

7. The work machine according to claim 1,
wherein the control device determines that the operation signal of the operating member is not input in a case where an operation signal of a gate locking lever is input.

* * * * *